July 9, 1929.  J. GOEBEL  1,720,396

AUTOMOBILE EXTRACTOR

Filed March 29, 1929

Inventor
J. Goebel
By his Attorney
Frank Ledermann

Patented July 9, 1929.

1,720,396

UNITED STATES PATENT OFFICE.

JOSEPH GOEBEL, OF BROOKLYN, NEW YORK.

AUTOMOBILE EXTRACTOR.

Application filed March 29, 1929. Serial No. 350,840.

The main object of this invention is to provide means for extracting vehicles from ruts in muddy road beds.

Another object of this invention is to provide a device which is placed on opposite sides of a wheel of a vehicle, and consists of a number of treads which are jammed beneath the tire of the wheel and provide a secure friction surface upon which the wheel may ride out of a deep rut or crevice in the roadway.

The above and other objects will become apparent in the description below, in which characters of reference refer to like-named parts in the drawing.

Referring briefly to the drawing, Figure 1 is a side elevational view of a vehicle showing the application of the extractor.

Figure 1:
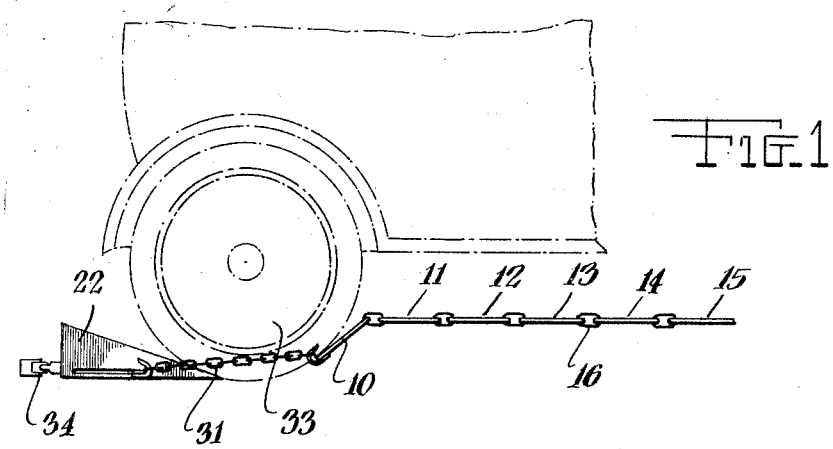
Figure 2:
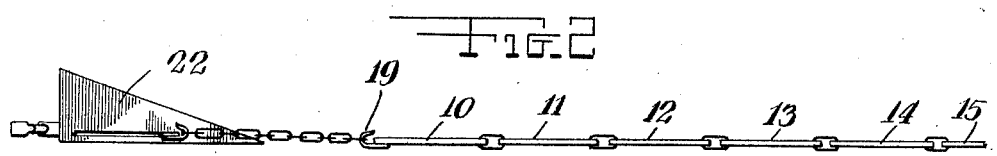
Figure 2 is an enlarged side elevational view of the extractor.
Figure 3:
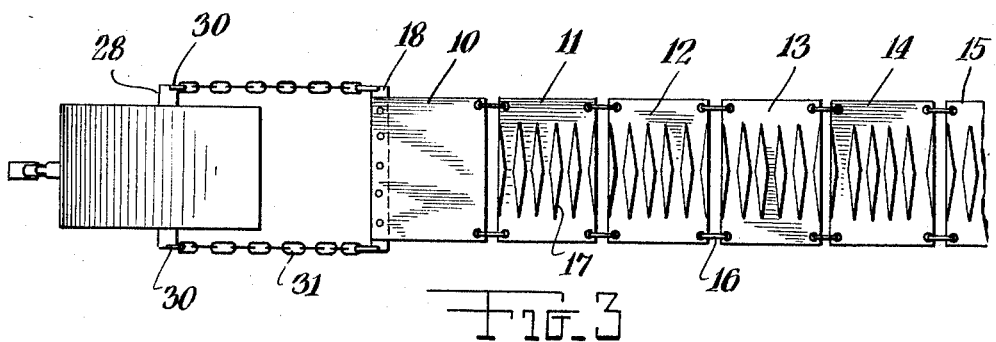
Figure 3 is a top plan view of Figure 2.
Figure 4:
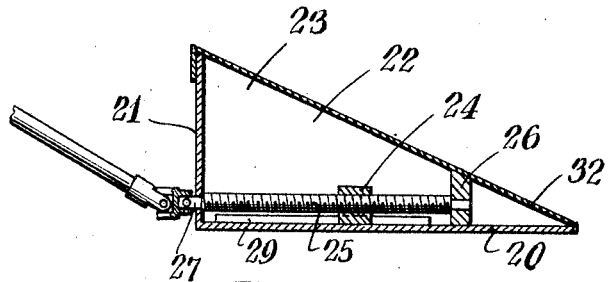
Figure 4 is a longitudinal sectional elevational view through the tread jamming mechanism.

Referring in detail to the drawing, the numeral 10 indicates a flat jam apron which is connected to a plurality of treads 11, 12, 13, 14 and 15. These treads are arranged side by side in series relation to each other and are connected by looped links 16 which permit the treads to be folded one upon another when the device is not in use. The treads and the jam apron are formed of some suitable and durable material such as diamond plate, and are provided with raised ridges or other conformations which may be like those indicated by the numeral 17. The one marginal edge of the apron has an arm 18 secured thereto. This arm extends from the corners of the apron and the extending ends are provided with hook members 19.

The jam apron and the series of tread plates connected thereto in an articulated manner are coupled to a jam mechanism which is located in an inclined housing. This housing comprises a floor 20 and an upright wall 21 and is enclosed by triangular side walls 22. Within the compartment 23 formed in the housing a traveling block 24 is movably mounted. This block is provided with a threaded opening midway of its length through which passes a threaded stud 25. The threaded stud has its forward end rotatably anchored in a divisor wall 26, and the opposing end of the threaded stud passes through an opening in the upright wall 21, and a reduced portion thereof extends beyond the wall in the form of a shank 27. The ends 28 of the traveling block are reduced and pass through horizontal slots 29 formed in the side walls 22 and project beyond the same. These projecting ends 28 of the traveling block are also provided with hook members 30. The hooks 30 of the jam mechanism are coupled to the hooks 19 of the jam apron by articulated chains or connecting elements 31, so constructed as to permit adjustability of the distances between the two units of the device. The compartments 23 is covered by an inclined jam plate 32.

This device is provided to aid in lifting vehicles out of ruts or deep crevices in a road bed and may be used universally, that is, the vehicle may be propelled out of the rut or crevice rearwardly or forwardly. In the illustration of Figure 1, the vehicle is being lifted out of the rut forwardly. In applying the device, the jam mechanism in the housing is rested upon the road bed immediately to the rear of the wheel 33 of the vehicle. The jam apron and the tread plates are arranged upon the ground as a tread surface immediately in front of the wheel and the chains 31 are then connected to the hooks 30 and the hooks 19 of both units of the device as close as possible to the wheel. The shank 27 of the threaded stud 25 has a universal joint 34 connected thereto which is provided with a socket and this socket receives a wrench or similar other tool which will permit the rotation of the threaded stud. The threaded stud 25 is then rotated through means of this wrench or tool and universal joint to retract the traveling block 24 rearwardly. As the housing rests rigidly to the rear of the tire of the wheel, the jam apron will be dragged beneath the tire of the wheel on the opposite side of the tire through the medium of the chains 31 being carried rearwardly by the traveling block 24. Jamming of this apron 10 beneath the traction surface of the tire presents a secure tread surface to the traction surface of the tire, and the vehicle may then be placed in motion and readily ride over the jam apron and out of the rut. As these tread plates and jam apron collectively have a length of five feet in the actual device, the vehicle is assured of being taken out of the rut.

It is to be noted that certain changes in form and construction may be made without departing from the spirit and scope of the invention.

I claim:

1. A device for extracting a vehicle from a rut comprising a housing adapted to be mounted behind a wheel and in contact with said wheel, a jam apron and treads adapted to be in contact with the forward portion of said wheel, and means in said housing for jamming said apron into contact with said wheel.

2. A device for extracting a vehicle from a rut comprising a housing adapted to be mounted behind a wheel and in contact with said wheel, a jam apron and treads adapted to be in contact with the forward portion of said wheel, and means in said housing for pulling said apron and treads beneath the traction surface of said wheel.

3. A device for extracting vehicles from a rut comprising a wedge-shaped housing adapted to be mounted behind the rear of the wheel of said vehicle, a jam apron adapted to be placed in front of said wheel, articulated treads connected in series to said apron, chains connected to said apron, and means in said housing engaging said chains for pulling said apron and treads beneath the traction surface of said wheel.

4. A device for extracting vehicles from a rut comprising a wedge-shaped housing adapted to be mounted behind the rear of the wheel of said vehicle, a jam apron adapted to be placed in front of said wheel, articulated treads connected in series to said apron, chains connected to said apron, said wedge-shaped housing having a traveling block therein, said block having said chains connected thereto, and means for retracting said block to urge said apron and treads beneath the traction surface of said wheel.

5. A device for extracting vehicles from a rut comprising a wedge-shaped housing adapted to be mounted behind the rear of the wheel of said vehicle, a jam apron adapted to be placed in front of said wheel, articulated treads connected in series to said apron, chains connected to said apron, said wedge-shaped housing having a traveling block therein, said block having said chains connected thereto, a threaded stud engaging said block for retracting the latter, said stud when rotated being adapted to retract said block to pull said apron and treads beneath said wheel, and detachable means for rotating said stud.

In testimony whereof I affix my signature.

JOSEPH GOEBEL.